United States Patent [19]

Le Noane et al.

[11] 4,407,667

[45] Oct. 4, 1983

[54] METHOD AND APPARATUS FOR FABRICATING OPTICAL FIBERS

[76] Inventors: Georges Le Noane, Kerrougant Bras, 22730 Tregastel; Daniel Boscher, Kerariou, 22560 Tregastel, both of France

[21] Appl. No.: 284,961

[22] Filed: Jul. 20, 1981

[30] Foreign Application Priority Data

Jul. 31, 1980 [FR] France .................................. 80 17005

[51] Int. Cl.³ ...................... C03B 20/00; C03B 37/025
[52] U.S. Cl. ..................................... 65/3.11; 65/3.12; 65/13; 65/152
[58] Field of Search .................... 65/3.11, 3.12, 3.2, 65/13, 152; 427/163

[56] References Cited

U.S. PATENT DOCUMENTS

| | | | |
|---|---|---|---|
| 2,992,517 | 7/1961 | Hicks, Jr. ............................. | 65/3.13 |
| 3,055,050 | 9/1962 | Schuller et al. ..................... | 65/13 X |
| 3,737,292 | 6/1973 | Keck et al. ........................... | 65/3.12 |
| 3,907,536 | 9/1975 | Achener ............................... | 65/3.2 X |
| 3,932,160 | 1/1976 | Camlibel et al. ..................... | 65/3.12 |
| 4,265,649 | 5/1981 | Achener ............................... | 65/3.12 X |
| 4,298,366 | 11/1981 | Dabby et al. ........................ | 65/3.12 |
| 4,310,339 | 1/1982 | Blankenship ........................ | 65/3.12 |

FOREIGN PATENT DOCUMENTS 2023127 12/1979 United Kingdom .

*Primary Examiner*—Richard V. Fisher
*Attorney, Agent, or Firm*—Larson and Taylor

[57] ABSTRACT

For continuous manufacture of optical fibers, bars of homogeneous silica-base material are welded in end to end relation. A silica cladding containing a proportion of index varying dopant which varies as the diameter of the cladding increases is progressively applied on a bar at a time to form successive preforms and the welded preforms are drawn out into fibers.

10 Claims, 4 Drawing Figures

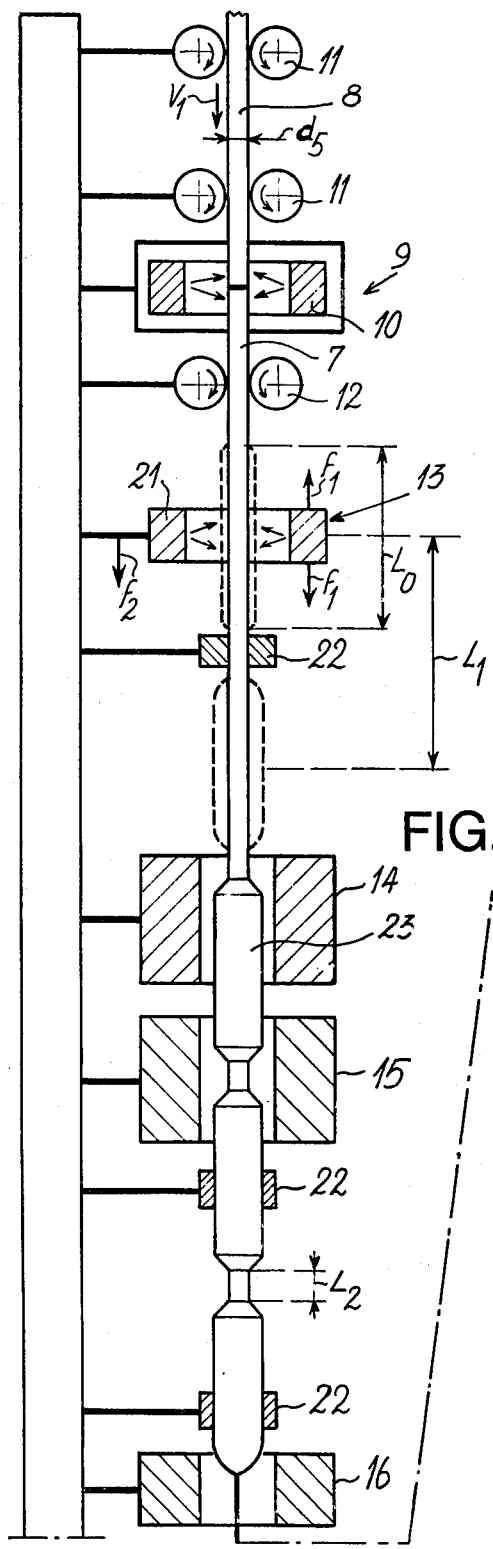
FIG.3
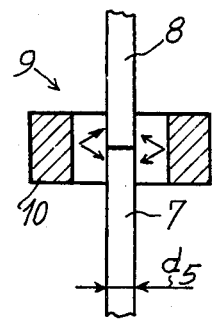
FIG.4
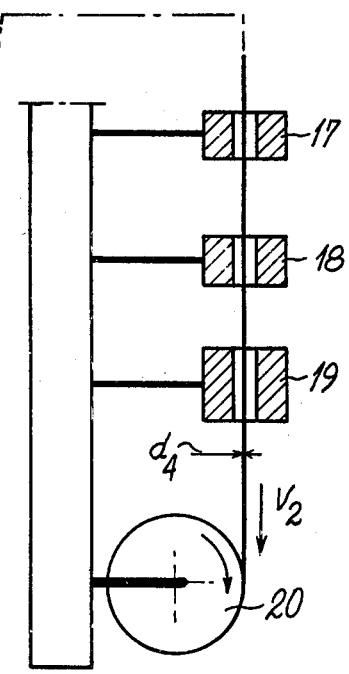

METHOD AND APPARATUS FOR FABRICATING OPTICAL FIBERS

BACKGROUND AND SUMMARY OF THE INVENTION

The present invention relates to a process and apparatus for manufacturing optical fibers (the term "optical" covering the infrared, visible and ultraviolet ranges of the spectrum) and it finds a particularly important application, although not exclusive, in the manufacture of optical fibers for telecommunication networks.

Optical fibers must fulfil two conditions, which are to a certain extent contradictory, for them to be suitable for use in a telecommunication network. Their attenuation must be low; it is considered that it must not exceed 3 to 4 dB/km at 0.85 micron (and preferably not exceed 2 dB/km at 1.3 micron). Their passband must reach about 200 MHz.km, which rules out step index fibers. The method of manufacture must be adapted to fabrication of large quantities at a moderate cost and it is expected that the requirements may be as high as one million kilometers per year.

At the present time, monomode fibers are scarcely used. Multimode fibers are either of the stepped index type, which comprises a central core surrounded by a cladding having a constant index but different from that of the core, or of the graded index type in which the cladding material has an index which varies in the radial direction.

Numerous methods are known for manufacturing optical fibers. None completely fulfils the above conditions.

The vapour-phase chemical deposition methods use heating means for growing a layer of material (generally doped silica) either radially on a tube or axially. Such methods provide step index or graded index fibers whose optical performance is largely sufficient for the contemplated applications. But the manufacturing costs are high, particularly because the whole body of the fiber (core and cladding) is manufactured by costly processes ill-adapted to mass production.

Those manufacturing methods which use glass-making techniques from material of high purity, using a double crucible (as disclosed for instance in U.S. Pat. No. 2,992,517 to Hicks), have the advantage of continuous operation. The phase-separation techniques have the disadvantage of being ill-adapted to the production of sufficiently pure materials from inexpensive base material which include impurities. The techniques for mass preparation of silica by reaction in a very-high-temperature plasma may also be mentioned. The latter process seems of particular interest since large ingots of silica having a good optical quality may be obtained at low cost from inexpensive base materials and the high temperature of the reaction in the plasma ensures purification. On the other hand, that high temperature prohibits the addition of numerous index varying dopants which are too volatile: at the present time, silica may only be doped with fluorine, which lowers its index. Finally, this process seems only applicable to the manufacture of stepped index fibers, comprising a pure or fluorine-doped silica core and a cladding formed by a plastic sheath, such as silicone. But such a stepped index fiber has a passband width limited to about 30 MHz.km, which is too low if the fiber is to be used for conveying data over distances reaching several kilometers. The stability of the fiber is doubtful since the optical interface is provided by a plastic material which is sensitive to external factors, such as moistness and temperature.

It is an object of the invention to provide a method of fabricating optical fibers adapted to manufacture of graded index fiber continuously and at moderate cost. For that purpose, a method according to the invention includes the steps of: welding bars of homogeneous silica-base material in end to end relation; progressively applying a silica cladding containing a proportion of index varying dopant which varies as the diameter of the cladding increases on said bars so as to form successive preforms; and drawing out the welded preforms to the fiber diameter.

The bars may be formed from pure or doped silica; the thickness of the deposit and the law of index profile variation will be chosen depending on the passband to be provided, and on the numerical aperture desired, by taking into account the maximum index variations which can be obtained by chemical-reaction deposition processes, particularly flame hydrolysis (also called "Outside Vapour Phase Oxidation" OVPO) which is of particular interest.

The additional steps for obtaining a directly usable fiber such as drying, application of coats, curing, storing, may be carried out continuously on the manufacturing line itself, rather than on successive batches.

The starting material for the method consists of silica bars which may be obtained at a low cost with the desired degree of purity using well-mastered techniques, typically reactive plasma. Only the cladding is manufactured by a relatively slow and costly chemical-reaction deposition process.

It is another aspect of the invention to provide an apparatus for continuous manufacture according to the above-defined process. According to another aspect of the invention, there is provided an apparatus for continuously manufacturing optical fibers, comprising: means for continuously advancing successive silica bars intended to form the core of fibers along a rectilinear path; means located on said path for welding the bars in end to end relation as their adjacent portions are moved past said means; deposition means for depositing by chemical reaction asilica base cladding containing a proportion of index varying dopant which is progressively varied as the diameter of the cladding increases and forming successive preforms; and means for drawing out the preforms to the diameter of the fiber.

The invention will be better understood from the following description of a method and an apparatus according to a particular embodiment thereof, given by way of example only. The description refers to the accompanying drawings.

SHORT DESCRIPTION OF THE DRAWINGS

FIG. 3 is a simplified diagram showing the distribution of the steps in an apparatus according to the invention; and FIG. 4 is a detail view showing a possible construction of the station for welding the bars in the apparatus of FIG. 3.

DETAILED DESCRIPTION OF A PARTICULAR EMBODIMENT

Figure 1:
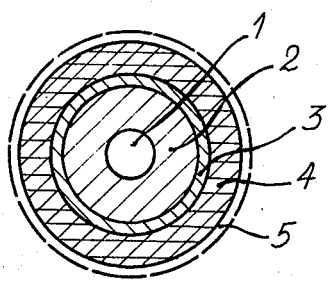
FIG. 1 is a schematical sectional view of a graded index multimode fiber having a fused pure silica core.
Figure 2:
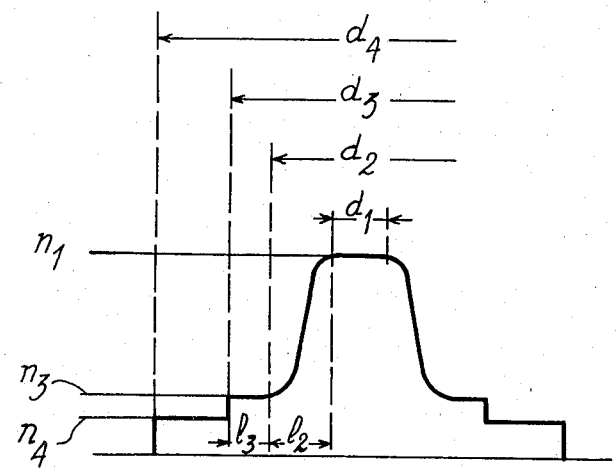
FIG. 2 is a curve representing the variation of the refraction index in the cross-section of a fiber of the kind shown in FIG. 1.

Referring to FIG. 1, there is shown a graded index fiber having a central core 1 made from doped or pure silica, depending on the value which it is desired to give to its index $n_1$ (FIG. 2). The core has a diameter $d_1$ and is surrounded by a first cladding of doped silica 2 having an index which varies from the inner circle of the cladding of diameter $d_1$ to the outer circle of the cladding, of diameter $d_2$. The first cladding 2 is surrounded by a second cladding 3, which will be typically made from doped silica having a constant index $n_3$ which is typically equal to the index of the first cladding along the outer circle. Finally, a plastic-material protection sheath 4 of plastics material, typically of silicone base material, surrounds the second cladding. To improve the mechanical strength of the fiber, an outside plastics sheath may cover the protection sheath 4. The characteristics of the plastics sheath are selected to fulfill mechanical criteria (for example resistance to abrasion) rather than optical criteria. Such a sheath 5 is shown in broken line in FIG. 1.

Conventional well known wire-drawing processes exist which render it possible to adjust diameter $d_1$ accurately by modifying the diameter of the starting silica bar. Depending on the value desired for index $n_1$, core 1 will be formed from pure silica or doped silica. However, present day techniques for producing good-optical-quality silica ingots at a low price limit practically to fluorine the dopants usable for the core.

The law of variation of index $n_2$ in the first cladding 2 is selected depending on the passband to be obtained and also to minimize its thickness $l_2$, since the cladding is a part of the fiber which is costly to produce by deposition. Numerous parameters are available (thickness $l_2$, values of index $n_2$ at the level of the inner circle and of the outer circle of classing 2, law of variation of the index) which may be adjusted. In the embodiment illustrated in FIG. 2, index $n_2$ is equal to $n_1$ at the junction (inner circle of the cladding) so as to ensure index continuity between core 1 and cladding 2.

The second cladding 3, having a width $l_3$ and a constant index $n_3$, will typically consist of doped silica. It constitutes an optical sheath of low thickness. The plastic sheath 4 of a material having an index $n_4$, has a thickness which will be typically a few tens of microns. It protects the fiber against abrasion and chemical agents.

The fiber which has been described may be considered as being a pseudo-graded index fiber: the central core has a constant index but the cladding has a variable index. Its transmission performances are sufficient for present applications in telecommunication networks.

Such a fiber may be fabricated in an apparatus of the kind shown in FIG. 3, which is arranged to receive silica bars and to deliver a fiber whose core results from drawing of the bars.

The bars are obtained from large-size ingots, whose weight may be of about 150 kg. Each ingot is drawn into several meters of rod. The rods are cut into homogenous bars, whose diameter $d_5$ is selected depending on the diameter $d_1$ of the core of the fiber to be produced (for example $d_5=10$ mm for $d_1=75$ microns). An accuracy of a few microns can be obtained in the diameter without difficulty using conventional methods. Before the bars are introduced into the apparatus, they are monitored: their geometrical characteristics are again monitored during drawing and possibly after drawing; their light attenuation coefficient is also measured by separate means (not shown).

The bars are then successively introduced into the apparatus where they are welded to each other at a welding station, forming a part of the apparatus. Referring to FIGS. 3 and 4, there are shown two successive bars 7 and 8 being welded at station 10. The bars are guided and moved continuously by driving means, shown schematically in FIG. 3 as comprising two sets of rollers 11 placed upstream of welding station 9 and a set of centring rollers 12 placed downstream.

Welding may be carried out while the bars are being moved downwardly. The downward movement impressed to the bars by means 11 will be a low speed $v_1$, typically about 8 mm per minute. The driving means may comprise, instead of friction rollers, caterpillar tracks or mobile jaws. The heat source of welding station 9 may be an oven, an annular welding torch or a radiant device. The heat source 10 is energized while adjacent end parts of two successive bars 7 and 8 are moved past the welding station.

Since the speed is slow, complete welding may be effected with a heat source having a relatively short length along the path of the bars.

The continuous rod thus formed passes through a deposition station 13 in which well known chemical reactions are used, such as vapour-phase or plasma reaction. That reaction may be flame-hydrolysis as described in French Pat. No. 2,213,243 (CORNING GLASS WORKS) or U.S. Pat. No. 3,737,292 (Keck et al). Vapour-phase deposition processes may also be mentioned which are derived from those mentioned at the beginning of this specification. Still other conventional deposition processes may be used.

As shown, the deposition station 13 comprises an oven carried by a carriage 21 provided with motor means (not shown) for reciprocating the carriage, as indicated by arrows $f_1$. The motor means additionally impart a downward movement, as shown by arrow $f_2$, while a length of rod is being processed and return the carriage to the original position for processing of a new length. The amplitude $L_0$ of the reciprocation corresponds to the length along which deposition is carried out at the same time, slightly less than the length of a bar. The downward speed $v_1$ of the bars is selected from the extent of travel $L_1$ of the carriage during its movement to be acceptable.

The length of the rod may reach several meters. Deposition of the cladding lengths may be carried out in succession over great lengths leading to preforms which each supplies several kilometers of fibers at the final diameter $d_3$. The growth of the deposit up to its final diameter is indicated with broken lines in FIG. 3.

When the deposit corresponding to a preform of length L has reached its final thickness, carriage 21 is returned to its starting point and another deposition step may be initiated to prepare a new length of preform. The return travel $L_1$ is sufficiently long to provide a separation $L_2$ between two successive preforms. Each preform will subsequently be drawn into a length of fiber which may be stored and qualified separately from the others.

If the conditions at station 13 are such there is no sintering, an additional heat treatment station 14 is provided where sintering may be carried out easily given the small thickness of the deposits. If necessary, a drying station 15 may be provided so as to improve the quality of the fiber. Such a station will be particularly useful for removing water when the deposition was by flame hydrolysis. Guides 22 are located between the successive stations for continuity of the downward movement of the preforms and for centering purpose. Such centering is required for avoiding differential thermal stresses which would cause deformations.

By way of example, a preform 500 mm in length may be manufactured by growing a vitreous deposit 3 mm thick on a bar having a diameter of 10 mm. Such a preform supplies 8.84 km of typical fiber whose dimension may be a diameter $d_1$ of 75 microns and a diameter $d_3$ of 120 microns. The duration of the deposition by flame hydrolysis is about one hour if the average deposition rate is 50 g/h. The downward speed $v_1$ of the preform is then 8.33 mm per minute. Each preform thus produced passes into a unit whose construction is similar to that of a conventional optical fiber drawing machine. In the embodiment shown in FIG. 3, the unit comprises a drawing-out furnace 16, a coating apparatus 18 and a drum 20 for winding the fiber. A checking station 17 is located on the path of the fiber between the furnace 16 and the coating apparatus. That station may include conventional means for measuring the diameter of the fiber. The output signal of the measuring means may be used for controlling the winding speed on drum 20. It should be noted that the fiber obtained is more even than in the case of a conventional machine, for the diameter of the preform is much more even than in the case of rods obtained by conventional vapour-phase chemical deposition processes and the deposit is much smaller in thickness and occurs on a calibrated substrate. The operation may be continuous because the speed $v_2$ of winding on the drum may be adjusted independently of speed $v_1$. Means may also be provided at the checking station for monitoring the optical characteristics of the fiber.

Other devices may be inserted in the path of the fiber, particularly a furnace 19 for curing the coating applied on the fiber in the coating apparatus 18 into a hard sheath 4 (FIG. 1).

Referring again to the manufacture of a fiber having the above-mentioned characteristics, the average fiber-drawing speed may be $v_2 = 147$ m per minute. The current value of speed $v_2$ is however permanently controlled so as to maintain diameter $d_4$ at a constant value. The average speed of the production apparatus is then 212 km per day, i.e. about 40,000 km per year. Such a production is much greater than with conventional processes.

It will be appreciated that the invention provides a process in which all operations are carried out continuously and in sequence in the same apparatus and avoids separate operations for preparation, collapsing of a tube into a rod and fiber-drawing. The deposition of material by a cost consuming and slower process is used only where it is strictly necessary.

Numerous modified embodiments will be apparent to those familiar with the art to which the invention relates and it should be understood that the scope of the present invention is limited only by the scope of the appended claims.

We claim:

1. A process for continuous manufacture of optical fibers, comprising the steps of advancing successive cylindrical bars of homogeneous silica-base material in end to end relation along a predetermined path; welding each of said bars to a preceding one of said bars as the rear end of said preceding bar is advanced past a welding location to form a train of bars along said path; progressively applying on each of said bars a silica cladding containing a proportion of index varying dopant which varies as the diameter of the cladding increases as it passes through a cladding zone so as to form successive welded and clad preforms; and drawing out each one of the welded and clad preforms in turn to the fiber diameter as said train advances, whereby lengths of optical fibers are obtained each corresponding to one of said preforms which have a core of constant index surrounded by an annular portion of variable index.

2. A process according to claim 1, wherein the silica cladding is applied in successive layers with an index continuously decreasing from the inside to the outside.

3. A process according to claim 1, wherein said bars and preforms are moved continuously at a constant average speed along a path and said steps are carried out at successive stations distributed along said path.

4. A process for continuous manufacture of optical fibers, comprising the steps of welding solid cylindrical bars of homogenous silica-base material having a constant index in end to end relation; forming a cladding on the bars by progressively applying on each of said bars by chemical reaction a proportion of index varying dopant which varies as the diameter of the cladding increases so as to form successive preforms; and drawing out the welded preforms to a fiber diameter, wherein the cladding is applied for forming a preform in a furnace which is simultaneously subjected to reciprocation over a length slightly smaller than the length of said preform and to a continuous advance movement along said path at the same average speed as said bars.

5. A process according to claim 4, wherein the cladding is applied in successive layers with an index varying from the inside to the outside, the innermost layer having an index substantially equal to the constant index of said bars, and the external layers having a constant index different from the index of said bars.

6. A process according to claim 4, wherein said bars are of doped silica having a constant index.

7. An apparatus for continuously manufacturing optical fibers, comprising: means for continuously advancing successive silica bars intended to form the core of fibers along a rectilinear path; means located on said path for welding the bars in end to end relation as their adjacent portions are moved past said welding means; deposition means for depositing by chemical reaction a silica base cladding containing a proportion of index varying dopant which is progressively varied as the diameter of the cladding increases,, motor means for subjecting said deposition means to a reciprocating movement along said path over a distance slightly smaller than the length of an individual bar and to an advance movement along said path, whereby successive preforms having a length slightly smaller than the length of an individual rod are formed; and means for drawing out the preforms to the diameter of the fiber.

8. Apparatus according to claim 7, wherein the drawing-out means comprise a furnace and means for pulling the fiber at a speed adjusted depending on the diameter of the fiber to be delivered.

9. A process for continuous manufacture of optical fiber, comprising the steps of continuously advancing successively welded, homogenous silica bars intended to form the core of successive fiber lengths along a linear path at a predetermined speed, progressively applying a cladding of silica containing a proportion of index decreasing dopant which continuously increases as the diameter of the cladding increases on each said bar in turn so as to form a preform; and drawing out the preform to the fiber diameter, at a speed much higher than said predetermined speed, whereby there is obtain from each said preform a length of fiber having an homogenous core of constant index surrounded by an annular portion of variable index.

10. A process according to claim 9, further comprising the step of continuously subjecting the fiber resulting from drawing out to at least one additional operation selected from glazing, drying, application of a coating forming a sheath and curing.

* * * * *